No. 735,125. PATENTED AUG. 4, 1903.
J. W. MELLOR.
BOX OPENER.
APPLICATION FILED MAR. 23, 1903.
NO MODEL.
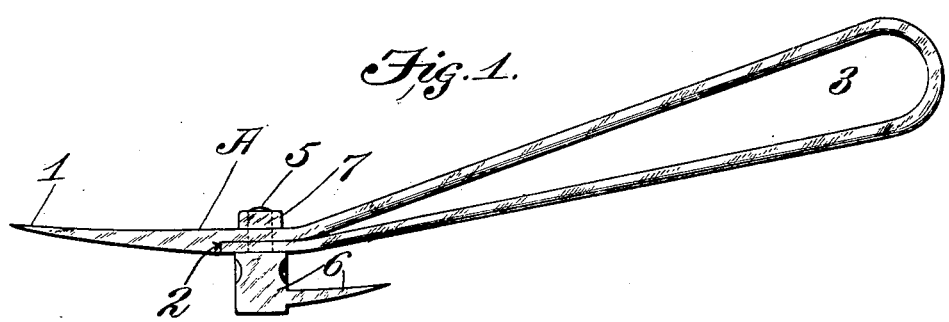
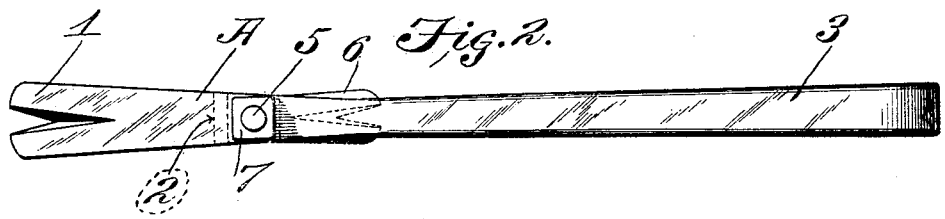
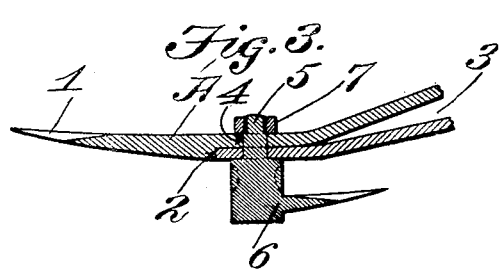
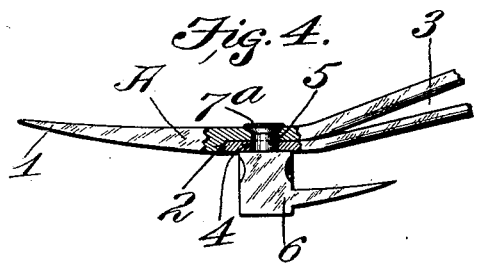
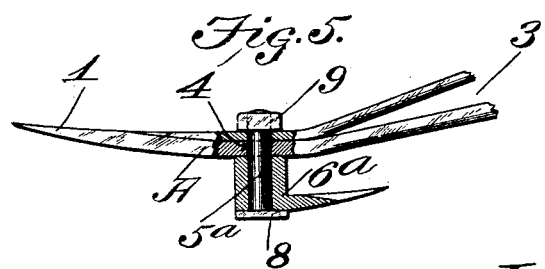
Witnesses:
G. A. Pennington
J. H. Gibbs
Inventor:
John W. Mellor,
by Bakewell Cornwall
Attys.

No. 735,125. Patented August 4, 1903.

UNITED STATES PATENT OFFICE.

JOHN W. MELLOR, OF SEDALIA, MISSOURI.

BOX-OPENER.

SPECIFICATION forming part of Letters Patent No. 735,125, dated August 4, 1903.

Application filed March 23, 1903. Serial No. 149,074. (No model.)

*To all whom it may concern:*

Be it known that I, JOHN W. MELLOR, a citizen of the United States, residing at Sedalia, Pettis county, Missouri, have invented a certain new and useful Improvement in Box-Openers, of which the following is a full, clear, and exact description, such as will enable others skilled in the art to which it appertains to make and use the same, reference being had to the accompanying drawings, forming part of this specification, in which—

Figure 1 is a side elevational view. Fig. 2 is a top plan view. Fig. 3 is a fragmentary longitudinal sectional view. Fig. 4 is a longitudinal fragmentary view, partially broken away; and Fig. 5 is a similar view of a modified form of construction.

This invention relates to improvements in tools designed especially for use in opening boxes; and it consists in certain features of novelty, all as hereinafter more fully pointed out, and specifically indicated in the claims.

The object of the invention is to provide a tool of the class described which can be economically manufactured and which will be extremely light and durable.

In the drawings the invention is illustrated in slightly-modified forms in details, which though important in manufacturing are not particularly essential in the finished article, though contributing to economy of production. The forward end of the tool terminates in a bifurcation or claw 1 of the usual form used for withdrawing nails, from which claw rearwardly extends the shank A and a handle portion, which latter is in the form of a loop. The shoulder 2 on the shank A is slightly rearward of the claw 1, and the handle extends thence rearwardly, upwardly, and forwardly in a loop 3, at the end of which the blunt end of said forwardly-projecting portion terminates at and abuts against said shoulder 2 or is welded to the said metal back of the claw, as may be preferred. (See Fig. 5.)

In case the metal is not welded it is desirable to provide an opening slightly in the rear of the shoulder 2 through both overlapping parts of the shank A, so that the securing-stud of the intermediate claw may be utilized as a securing means for the parts of the tool at that point. In any event the opening 4 is provided, and projecting therethrough is a stud 5 or bolt $5^a$.

In the form of construction shown in Figs. 1, 2, 3, and 4 the claw member 6 has an integral stud 5, which is held in place either by a screw-threaded nut 7 or by upsetting the end $7^a$, as in Fig. 4. In Fig. 5 the claw member $6^a$ is formed with an opening therethrough coinciding with the opening 4 of the shank A, and through this opening is projected a bolt $5^a$, the head 8 of which forms the hammer-head, the shank the connecting means, and has the nut 9 screwed on the end of said shank, which nut may be loosened or removed to permit adjustment or removal of the claw portion $6^a$, if desired, as in case of renewal or when it is desired to place the respective claws in any other position or angle than shown.

Placing the shoulder 2 at the lower side of the shank A tends to strengthen the tool, because when pressure is applied downwardly to the handle to withdraw a nail with the forward claw 1 the shoulder serves as a stop for the forward end of the return bent portion of the handle.

I am aware that minor changes in the construction, arrangement, and combination of the several parts of my device can be made and substituted for those herein shown and described without in the least departing from the nature and principle of my invention.

Having thus described my invention, what I claim as new, and desire to secure by Letters Patent, is—

1. As a new article of manufacture, a tool provided with a handle formed of a looped portion terminating at one end in a lifting-claw, and having an intermediate, separable, oppositely-disposed, claw portion secured thereto; substantially as described.

2. As a new article of manufacture, a tool provided with a handle at one end thereof, and terminating at its opposite end in an integral lifting-claw, and having connected therewith an intermediate claw portion the jaws of which extend rearwardly, substantially parallel with the handle portion, said intermediate claw portion being secured in position by means of a bolt with integral larger head which is adapted to serve as a hammer-head; substantially as described.

3. As a new article of manufacture, a tool of the class described provided with a claw portion at one end, extending thence rearwardly in the form of a loop to form a handle portion and an intermediate detachable combination claw and hammer portion secured to the shank between said handle and claw; substantially as described.

4. As a new article of manufacture, a tool formed of a single piece of metal having a claw at one end, a shoulder projecting therefrom, back of said claw, thereby forming a stop for a return bent portion which forms a portion of the handle, and an intermediate claw secured thereto in such manner as to hold the said parts in position; substantially as described.

In testimony whereof I hereunto affix my signature, in the presence of two witnesses, this 17th day of March, 1903.

JOHN W. MELLOR.

Witnesses:
G. A. PENNINGTON,
GEORGE BAKEWELL.